Nov. 9, 1937.  C. S. ASH  2,098,851
VEHICLE WHEEL
Original Filed Jan. 31, 1925
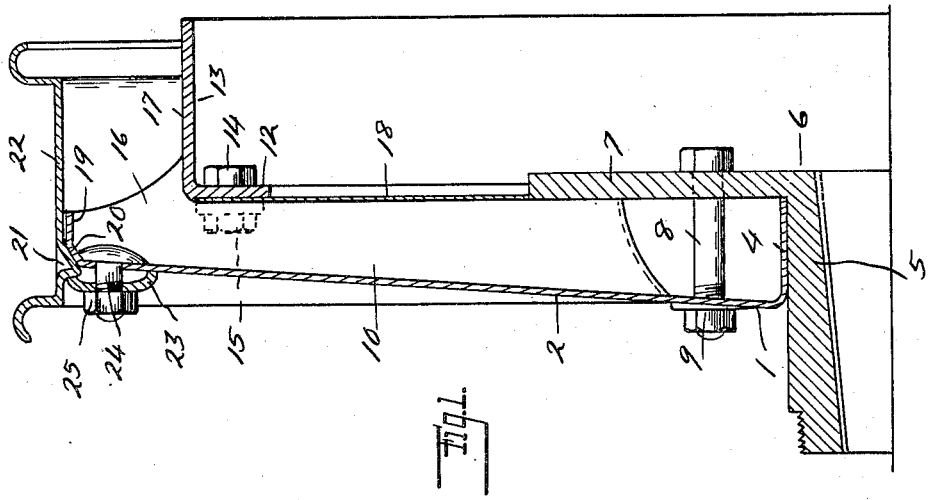
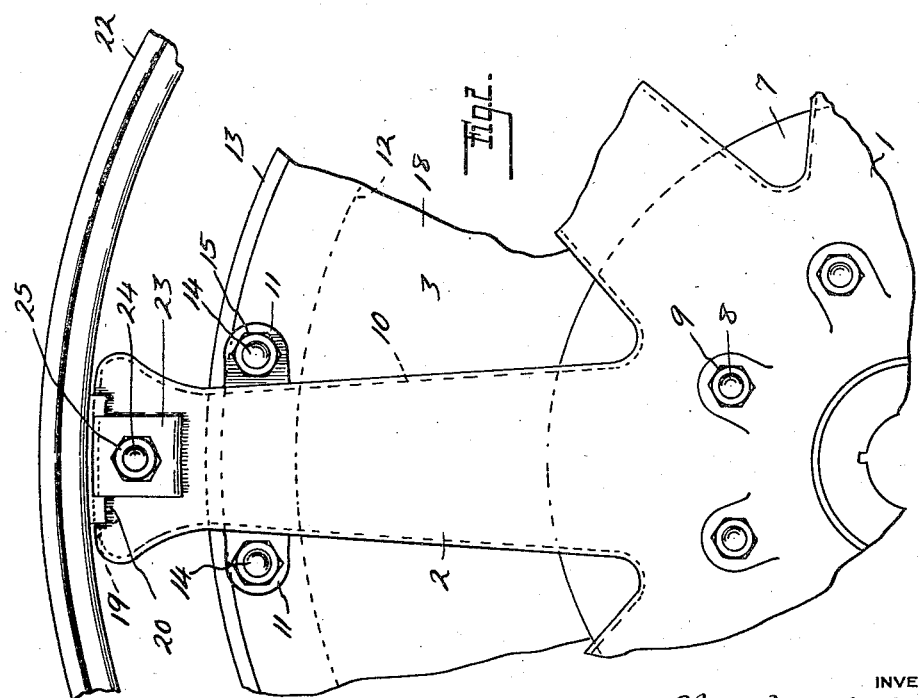
INVENTOR
Charles S. Ash
BY
ATTORNEYS Patented Nov. 9, 1937

2,098,851

UNITED STATES PATENT OFFICE 2,098,851

VEHICLE WHEEL

Charles S. Ash, Birmingham, Mich., assignor, by mesne assignments, to The Kelsey-Hayes Wheel Company, Detroit, Mich., a corporation of Delaware Original application January 31, 1925, Serial No. 5,998. Divided and this application June 25, 1931, Serial No. 546,881. Renewed July 19, 1933

2 Claims. (Cl. 301—64)

The invention relates to vehicle wheels and has for one of its objects to so construct a wheel that it is reinforced by a brake drum and that it positions this brake drum. Other objects are to provide an improved construction of spoked wheel and to provide an improved mounting for a wheel of this type. These and other objects of the invention will become apparent from the following description, taken in connection with the accompanying drawing, in which Figure 1 is a transverse section through a portion of a wheel and its hub showing an embodiment of my invention;

Figure 2 is a side elevation thereof.

The wheel has its web or body formed with the hub portion 1 and the radial spokes 2, which latter are integrally united at their inner ends to the hub portion and radiate outwardly from the hub portion in spaced apart relation providing the axially disposed openings 3 therebetween. The web or body may be a sheet metal stamping, as shown, in which case the openings are perforations, or the web or body may be a casting.

Both the hub portion and the spokes are hollow, the hub portion having at its inner edge the axially extending annular flange or rib 4 providing the axial opening to receive the barrel 5 of the wheel or inner hub 6. This latter has the usual outwardly extending flange 7 against which the annular flange or rib 5 bears or abuts and to which the web or body of the wheel is demountably secured by the bolts 8 and the nuts 9, the bolts extending through openings in the front wall of the hub portion and through openings in the annular flange. As shown, the parts of the web or body of the wheel adjacent the openings or perforations 3 are bent over to form the stiffening flanges or ribs 10 with the inner portions of these flanges or ribs bearing against or abutting the annular flange 7 of the wheel or inner hub when the demountable wheel is secured in place. The bolts 8 are located to extend intermediate the points of engagement of the flange or rib 4 with the annular flange 7 and the inner portions of the flanges or ribs 10 with the annular flange 7. More specifically, the spokes 2 are preferably substantially C-shaped in cross section to present the appearance at the front side of the wheel of rounded and shaped wood spokes. The spokes 2 are open at the rear side of the wheel to provide lightness in weight and cheapness in construction, this form permitting of forming by means of a simple stamping or casting operation and also permitting the interior of the hollow web or body of the wheel to be thoroughly coated so that it will not rust and soon deteriorate.

At the desired points outwardly of each spoke the ears 11 are formed thereon and preferably integral therewith for the attachment to the web or body of the wheel of the inwardly extending flange 12 of the brake drum 13, which latter is detachably secured to the ears by suitable means such as the bolts 14 and the nuts 15. The side walls of the spokes 2 are formed with the portions 16 which extend over and engage the periphery of the brake flange 17 of the brake drum, these portions thus forming centering means for the brake drum. The front side of the brake drum and a portion of the rear open side of the hollow spokes are preferably closed by a thin disk 18 of sheet metal interposed between the spokes 2 and the flange 12 of the brake drum and extending inwardly to meet the outer edge of the annular flange 7 of the wheel or inner hub, this disk being also secured in place by the bolts 14 and the nuts 15.

Securing of the brake drum 13 to the spokes 2 greatly strengthens these spokes so that a demountable rim may be mounted directly upon their ends without the necessity of a wheel felly or permanent rim to connect these ends. The outer end of each spoke is formed with a laterally extending flange or end wall 19 integral with the spoke and in this flange is formed the depression or recess 20 to receive the projection or lug 21 struck inwardly from the base of the detachable or demountable rim 22. The rim is clamped in place with the projections or lugs seated in the depressions or recesses by the clamps 23 and the securing bolts 24 and the nuts 25. The rim is therefore supported only at spaced apart points directly upon the outer ends of the spokes, thus doing away with the usual felly or permanent rim and securing a construction which is very light in weight yet amply strong and rigid.

The present application is a division of my co-pending application Serial Number 5,998, filed January 31, 1925 and entitled "Wheel unit sets for motor vehicles".

What I claim as my invention is:

1. In a wheel, the combination with a hub provided with an annular flange projecting therefrom, of a wheel body provided with an axially disposed annular rib on the inner edge thereof adapted to bear against said flange, said wheel body being also provided with axially disposed perforations, the parts of the wheel body adjacent said perforations being bent over to form stiffening ribs, the inner portions of said ribs bearing against said hub flange with fastening bolts passing through said wheel body and said hub flange intermediate of the points of engagement of said wheel body ribs and said hub flange, said bolts holding said wheel body in firm engagement with said hub flange.

2. In a wheel, the combination with an inner hub provided with an annular flange projecting therefrom, of a wheel body having a hub portion and spokes radiating therefrom, said hub portion being provided at its inner edge with an axially extending annular flange adapted to bear against said first mentioned flange, said spokes being provided with spaced side walls connecting into each other at their inner portions and adapted to bear against said first mentioned flange, and means for securing said wheel body to said inner hub, comprising members passing through said hub portion and first mentioned flange intermediate the points of engagement of said flange on said hub portion and said first mentioned flange and of the inner portions of said side walls and said first mentioned flange.

CHARLES S. ASH.